United States Patent
Bieberdorf et al.

(10) Patent No.: US 6,984,053 B1
(45) Date of Patent: Jan. 10, 2006

(54) AIRPORT LIGHT INSTALLATION

(76) Inventors: Roger Bieberdorf, 3060 N. Ridgecrest #115, Mesa, AZ (US) 85207; Gordon R. Fritz, 212 S. Malcolm Dr., Apache Junction, AZ (US) 85220

( * ) Notice: Subject to any disclaimer, the term of this patent is extended or adjusted under 35 U.S.C. 154(b) by 139 days.

(21) Appl. No.: 10/703,731

(22) Filed: Nov. 7, 2003

(51) Int. Cl.
*E01F 9/00* (2006.01)
(52) U.S. Cl. .................... 362/153.1; 362/153
(58) Field of Classification Search .............. 362/226, 362/153, 153.1, 145, 640
See application file for complete search history.

(56) References Cited

U.S. PATENT DOCUMENTS

| | | | |
|---|---|---|---|
| 4,302,799 A | * 11/1981 | Behrens | 362/226 |
| 5,436,812 A | * 7/1995 | Stewart | 362/153.1 |
| 5,541,362 A | * 7/1996 | Reinert, Sr. | 174/37 |
| 5,971,561 A | * 10/1999 | Fitzwater | 362/145 |
| 6,527,407 B2 | 3/2003 | Gluck | |
| 6,572,240 B2 | 6/2003 | Reinert, Sr. | |

* cited by examiner

*Primary Examiner*—Thomas M. Sember
*Assistant Examiner*—James W. Cranson, Jr.
(74) *Attorney, Agent, or Firm*—Parsons & Goltry; Michael W. Goltry; Robert A. Parsons

(57) ABSTRACT

An airport light installation is disclosed, which includes an airport light support having a coupling, and an elongate column having a proximal end removably attached to the coupling, an opposing distal end, and a frangible area between the proximal end and the distal end. A light fixture is carried by the distal end of the elongate column.

28 Claims, 8 Drawing Sheets

AIRPORT LIGHT INSTALLATION

FIELD OF THE INVENTION

The present invention relates to airport light installations.

BACKGROUND OF THE INVENTION

Modern airports incorporate specialized lighting systems including, for instance, runway touchdown zone lighting systems, runway centerline lighting systems, taxiway centerline lighting systems, and edge lighting systems. Edge lighting systems are important because they help to define runways and taxiways and inhibit pilots from inadvertently driving their airplanes off the designated runway and taxiway areas. Most edge light installations incorporate a light fixture assembly that is attached to a support embedded into the ground. The light fixture assembly consists of a column having an end attached to a coupling of the support and an opposing end that carries a light fixture. The column projects upwardly from the coupling and supports the light fixture above the ground, thus providing above-ground lighting. An electrical plug at the bottom of the column is used to couple the electrical wiring of the light fixture to the electrical wiring of the airport.

The coupling has a frangible area, and is referred to as a frangible coupling. The frangible area of the coupling permits the coupling to break when struck by a plane or other vehicle, which is a common occurrence at airports. The plug is adapted to decouple when the coupling breaks to prevent damage to the electrical wiring of the airport, permitting the light fixture assembly and the broken off half of the coupling attached thereto to fall away from the support to minimize damage to aircraft. When a light fixture assembly is so broken away from its support, the other half of the coupling attached to the support must first be removed and replaced and then a new light fixture assembly attached thereto after, of course, securing the electrical plug between the wiring of the new light fixture assembly and the electrical wiring of the airport. The coupling is usually threaded to a lid or female coupling attached to the support. After a coupling is broken, removal of the part of the coupling remaining attached to the lid can be tremendously difficult and time consuming due to corrosion that normally occurs at the threaded attachment area, and because the threaded attachment area is often damaged when the light fixture assembly is struck by a plane or other vehicle. Often, the part of the coupling remaining attached to the lid is so severely damaged that it must be chipped away, which is a very time consuming, tedious, and difficult task.

Given these and other deficiencies in the art, the need for certain new and useful improvements is evident.

SUMMARY OF THE INVENTION

The above problems and others are at least partially solved and the above objects and others realized in a preferred embodiment of an airport light installation, which consists of an airport light support having a coupling, and an elongate column having a proximal end attached to the coupling, an opposing distal end, and a frangible area between the proximal end and the distal end. The distal end of the elongate column carries a light fixture, and the proximal end is preferably removably attached to the coupling. The coupling supports a locking element, which is adjustable between a first position releasing the proximal end from the coupling and a second position securing the proximal end to the coupling. Preferably, the coupling is removably attached to the airport light support. In a particular embodiment, the coupling is threadably secured to the airport light support, which represents a preferred embodiment of removably attaching the coupling. Other ways of removably attaching the coupling will readily occur to those having regard for the art. Preferably, the frangible area is disposed outboard of the coupling. The invention also provides an airport lighting system incorporating the instant embodiment of the airport light installation.

Another preferred embodiment of an airport light installation includes an airport light container, and a lid, having a coupling, removably attached to the container. Further to the present embodiment is an elongate column having a proximal end attached to the coupling, an opposing distal end, and a frangible area between the proximal end and the distal end. The distal end of the elongate column carries a light fixture. The proximal end is preferably removably attached to the coupling. The coupling supports a locking element, which is adjustable between a first position releasing the proximal end from the coupling and a second position securing the proximal end to the coupling. Preferably, the coupling is removably attached to the lid. In a particular embodiment, the coupling is threadably secured to the lid, which represents a preferred embodiment of removably attaching the coupling. Other ways of removably attaching the coupling will readily occur to those having regard for the art. Preferably, the frangible area is disposed outboard of the coupling. The invention also provides an airport lighting system incorporating the instant embodiment of the airport light installation.

In an airport light installation including an airport light support and a coupling carried thereby, the invention provides improvements therein including an elongate column having a proximal end attached to the coupling, an opposing distal end, a frangible area of the elongate column between the proximal end and the distal end, and a light fixture carried by the distal end of the elongate column. The proximal end is removably attached to the coupling. A locking element is carried by the coupling, and is movable between a first position releasing the proximal end from the coupling and a second position securing the proximal end to the coupling. Preferably, the coupling is removably attached to the airport light support. In a particular embodiment, the coupling is threadably secured to the airport light support, which represents a preferred embodiment of removably attaching the coupling. Other ways of removably attaching the coupling will readily occur to those having regard for the art. Preferably, the frangible area is disposed outboard of the coupling. The invention also provides a lighting system having an airport light installation incorporating the improvements of the instant embodiment of the invention.

In an airport light installation including an airport light container, a lid removably attached to the container, and a coupling carried by the lid, the invention further provides improvements therein including an elongate column having a proximal end attached to the coupling, an opposing distal end, a frangible area of the elongate column between the proximal end and the distal end, and a light fixture carried by the distal end of the elongate column. The proximal end is removably attached to the coupling. A locking element is carried by the coupling, and is movable between a first position releasing the proximal end from the coupling and a second position securing the proximal end to the coupling. Preferably, the coupling is removably attached to the lid. In a particular embodiment, the coupling is threadably secured to the lid, which represents a preferred embodiment of removably attaching the coupling. Other ways of removably attaching the coupling will readily occur to those having regard for the art. Preferably, the frangible area is disposed outboard of the coupling. The invention also provides a lighting system having an airport light installation incorporating the improvements of the instant embodiment of the invention.

Consistent with the foregoing summary of preferred embodiments of the invention and the ensuing specification, which are to be taken together, the invention also contemplates associated apparatus and method embodiments.

BRIEF DESCRIPTION OF THE DRAWINGS

Referring to the drawings.

DETAILED DESCRIPTION OF A PREFERRED EMBODIMENT

Disclosed herein is an airport light installation, which consists of an airport light support or light base having a coupling, and an elongate column having a proximal end attached to the coupling, an opposing distal end, and a frangible area between the proximal end and the distal end. A light fixture is carried by the distal end of the elongate column, and the proximal end is preferably removably attached to the coupling. The coupling supports a locking element, which is adjustable between a first position releasing the proximal end from the coupling and a second position securing the proximal end to the coupling. The coupling is removably attached to the airport light support, although it can be immovably attached, if desired. In a particular embodiment, the coupling is threadably secured to the airport light support, which represents a preferred embodiment of removably attaching the coupling. Other ways of removably attaching the coupling will readily occur to those having regard for the art. The frangible area is a weakened area of column, and is disposed outboard of the coupling. The invention also provides an airport lighting system incorporating the instant embodiment of the airport light installation, and related embodiments to be described herein.

Figure 1:
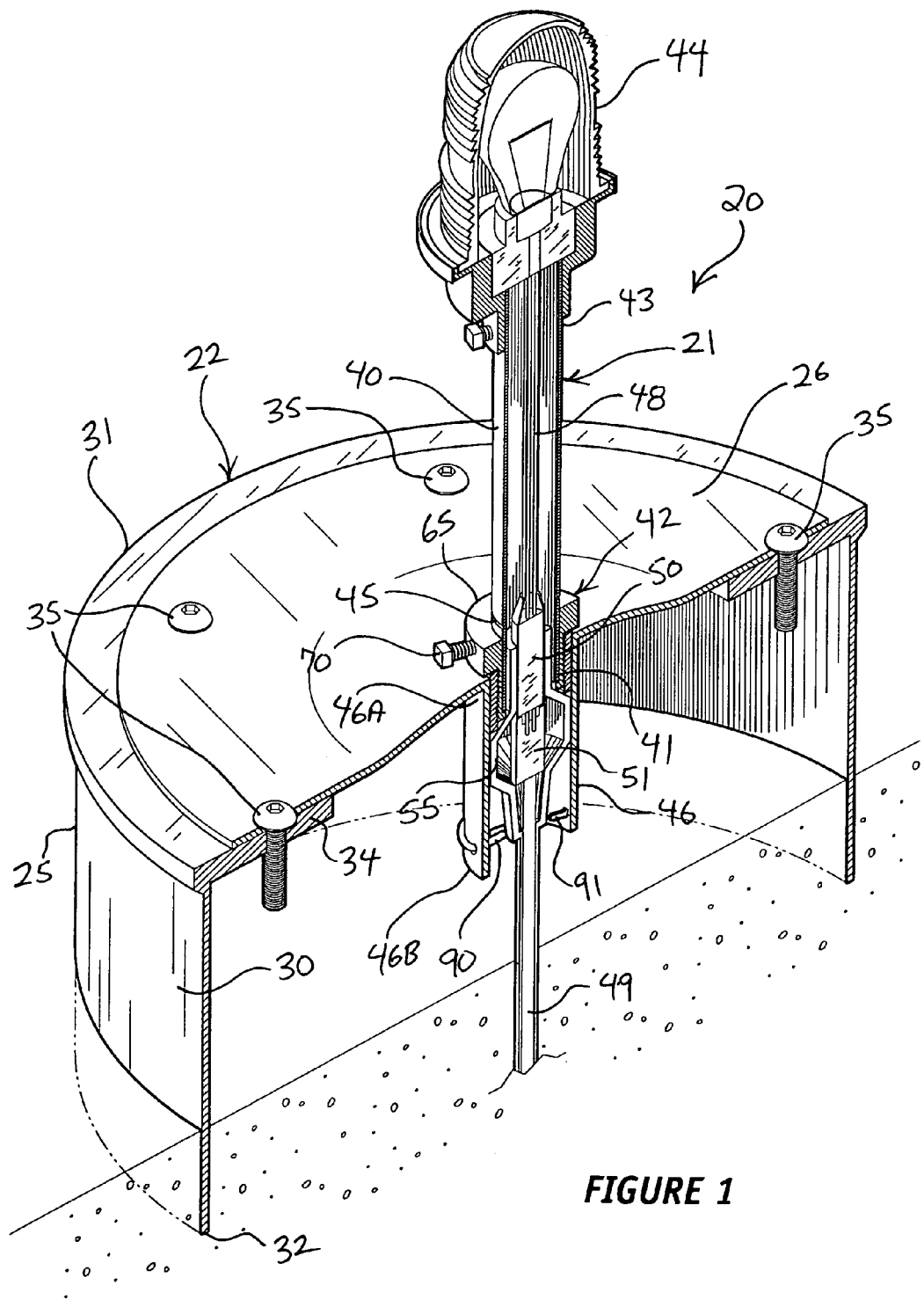
FIG. 1 is an isometric view, partially in section, of an airport light installation constructed and arranged in accordance with the principle of the invention, the airport light installation including a light fixture assembly, having a frangible area, attached to a coupling secured to a lid, having a sleeve depending therefrom, of an airport light support.
Figure 2:
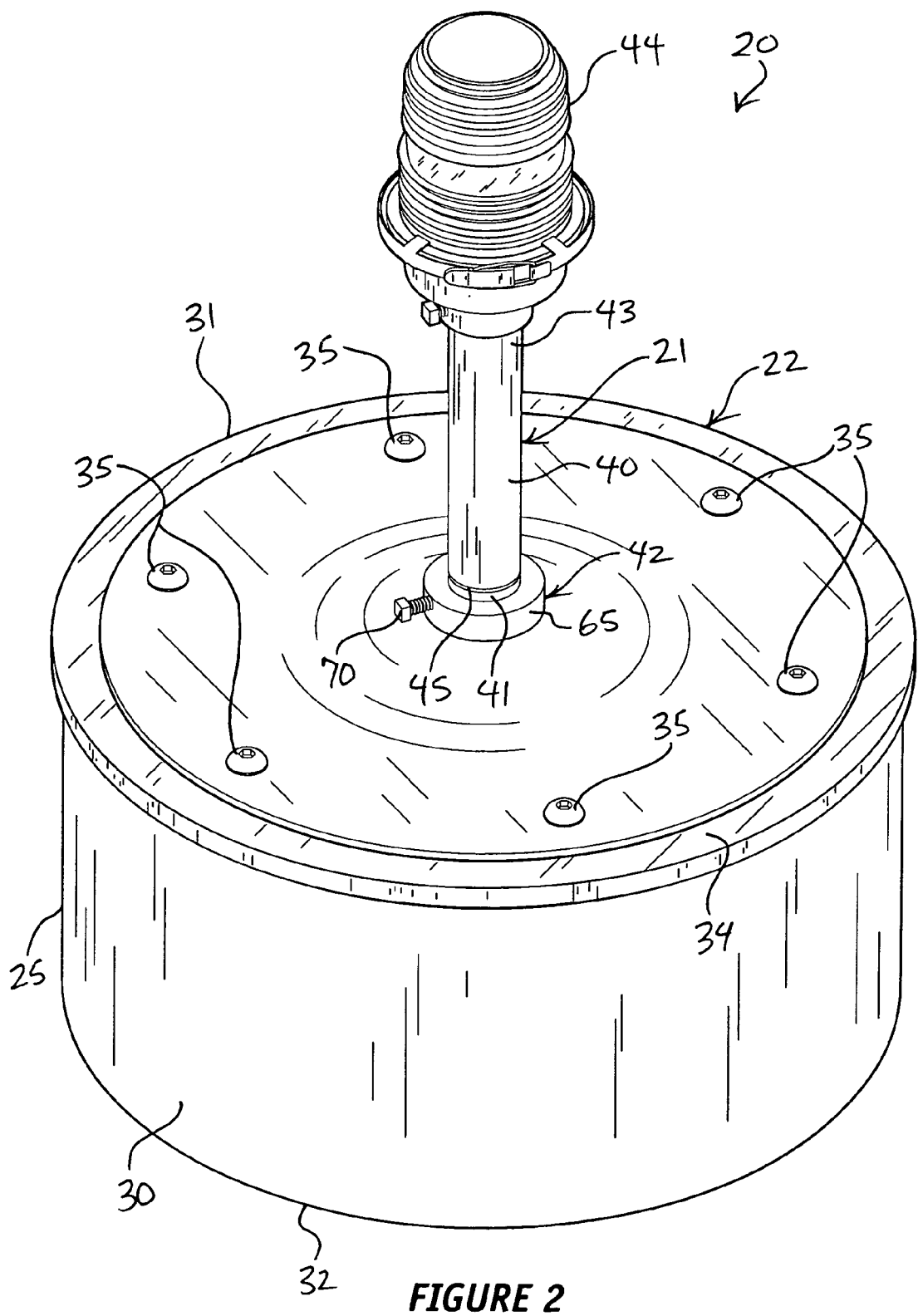
FIG. 2 is an isometric view of the airport light installation of FIG. 1.
Figure 3:
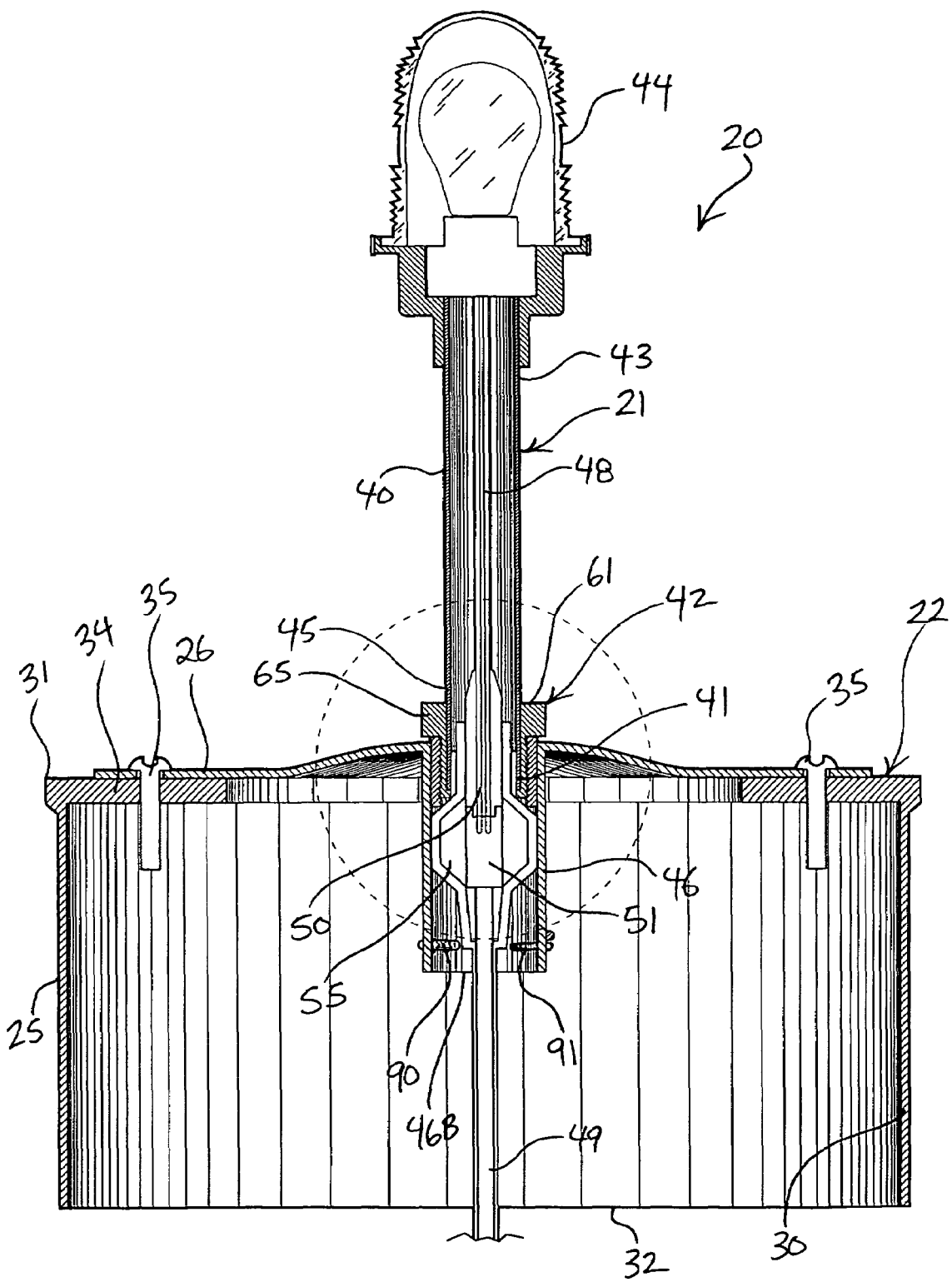
FIG. 3 is an elevation view, partially in section, of the airport light installation of FIG. 1.

An airport light installation will now be described with reference to FIGS. 1–9. Referring to FIGS. 1–3, there is seen airport light installation 20 including a light fixture assembly 21 attached to and depending upwardly from a light base or support 22. Support 22 is to be partially embedded adjacent a runway or taxiway area so as to form part of a set-in-the-ground airport lighting system. Support 22 consists of a container 25 and an attached cover or lid 26 to which light fixture assembly 21 is attached and that projects upwardly therefrom as illustrated. Container 25 and lid 26 are each strong and rigid and fashioned from steel, aluminum, or other selected metal, metal composite, or the like. Container 25 consists of a continuous sidewall 30 having an upper extremity 31, and an opposing lower extremity 32. Lower extremity 32 is open in the drawings, but it is usually closed with a bottom plate (not shown). Upper extremity 31 is constructed with an inverted flange 34 having a standard set of threaded holes that match a corresponding standard set of openings through lid 26, which permits lid 26 to be bolted onto flange 34 with threaded bolts 35. Bolts 35 provide for the removable attachment of lid 26 to container 25, so that lid 26 can be easily removed for replacement or maintenance. Although bolts 35 are preferred for providing a removable attachment of lid 26 to container 25, lid 26 can be removably attached to container 25 in other ways. If desired, lid 26 can be welded to container 25, riveted to container, or even integrally formed with container 25.

Light fixture assembly 21 includes an elongate, rigid conduit or column 40 having a proximal end 41 attached to a coupling 42 secured to lid 26 at a generally central location thereof, and an opposing distal end 43. A light fixture 44 is attached to, and carried by, distal end 43 in a conventional manner. Light fixture 44 is generally representative of a typical light fixture commonly used with airport lighting systems, and details thereof not specifically illustrated and described will be readily understood and appreciated by those skilled in the art.

Column 40 is fashioned of steel, aluminum, plastic, or other substantially rigid material or combination of materials, and is formed with a frangible feature or area 45, which is located between proximal and distal ends 41 and 43 and, moreover, between coupling 42 and light fixture 44. In accordance with the preferred embodiment disclosed herein, frangible area 45 is located closer to proximal end 41 and to coupling 42 than to distal end 43 and light fixture 44. It is to be understood that frangible area 45 can be located at any desired position between coupling 42 and light fixture 44. However, it is preferred that frangible area 45 be located approximately one to two inches above coupling in order to comply with current Federal Aviation Administration regulations concerning airport light fixtures. In a particular embodiment, frangible area 45 is located approximately 1.5 inches above coupling 42.

As best seen in FIGS. 1 and 3, a cylindrical sleeve 46 depends downwardly from lid 26. Sleeve 46 has opposing upper and lower ends 46A and 46B, and coupling 42 is attached to lid at upper end 46A of sleeve 46. Coupling 42 can be considered part of lid 26, and sleeve 46 can be considered an extension of coupling 42. Electrical wiring 48 is coupled to light fixture 44 and passes downwardly through column 40 and coupling 42 and through upper end 46A of sleeve 46, which connects to electrical cabling 49 provided throughout the infrastructure of an airport lighting system. Electrical wiring 48 incorporates an electrical connector 50, which couples to a corresponding electrical connector 51 of electrical cabling 49. Connector 50 extends through coupling 42 and into and through upper end 46A of sleeve 46, and connector 51 extends into and through lower end 46B of sleeve 46.

Connectors 50 and 51 cooperate as an electrical plug or plug assembly, which is disposed generally at the area within coupling 42 and sleeve 46. An external protective sheath 55, which is constructed of an electrically insulating material such as rubber or other electrically insulating material, is attached to connector 51 and to cabling 49. Sheath 55 encircles and is attached connector 51, and is considered part of connector 51. Connector 50 extends into sheath 55 and connects to connector 51. Sheath 55 also encircles a portion of connector 50. Like the described plug assembly, which is the combination of connectors 50 and 51, sheath 55 is also located generally at the area within coupling 42 and sleeve 46. Sheath 55 functions to protect the plug assembly from moisture and other external influences, and also functions to hold connectors 50 and 51 together.

Figure 4:
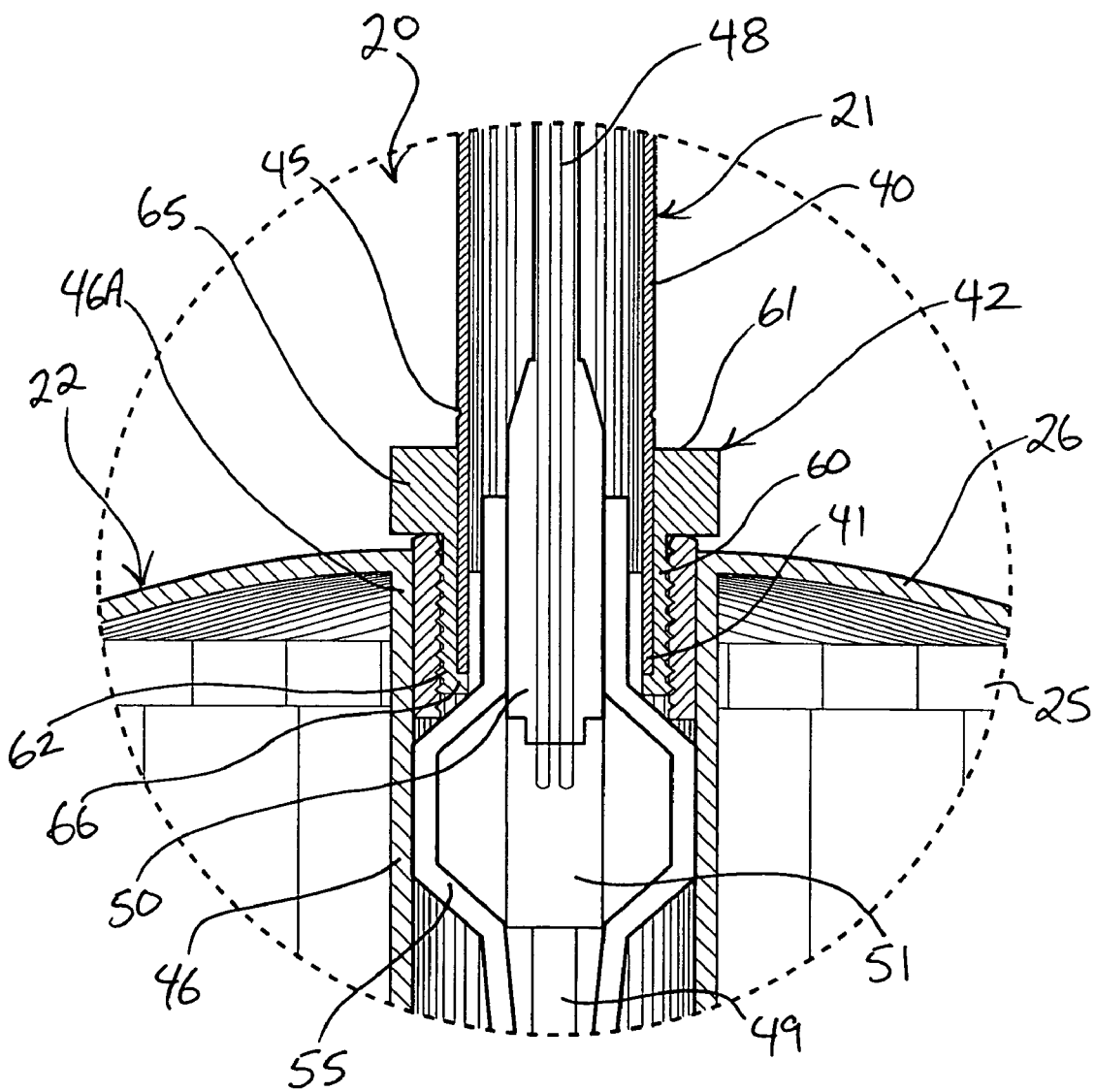
FIG. 4 is an enlarged elevation view, partially in section, of the airport light installation of FIG. 1, illustrating an end of the light fixture assembly secured to a coupling attached to the airport light support.
Figure 5:
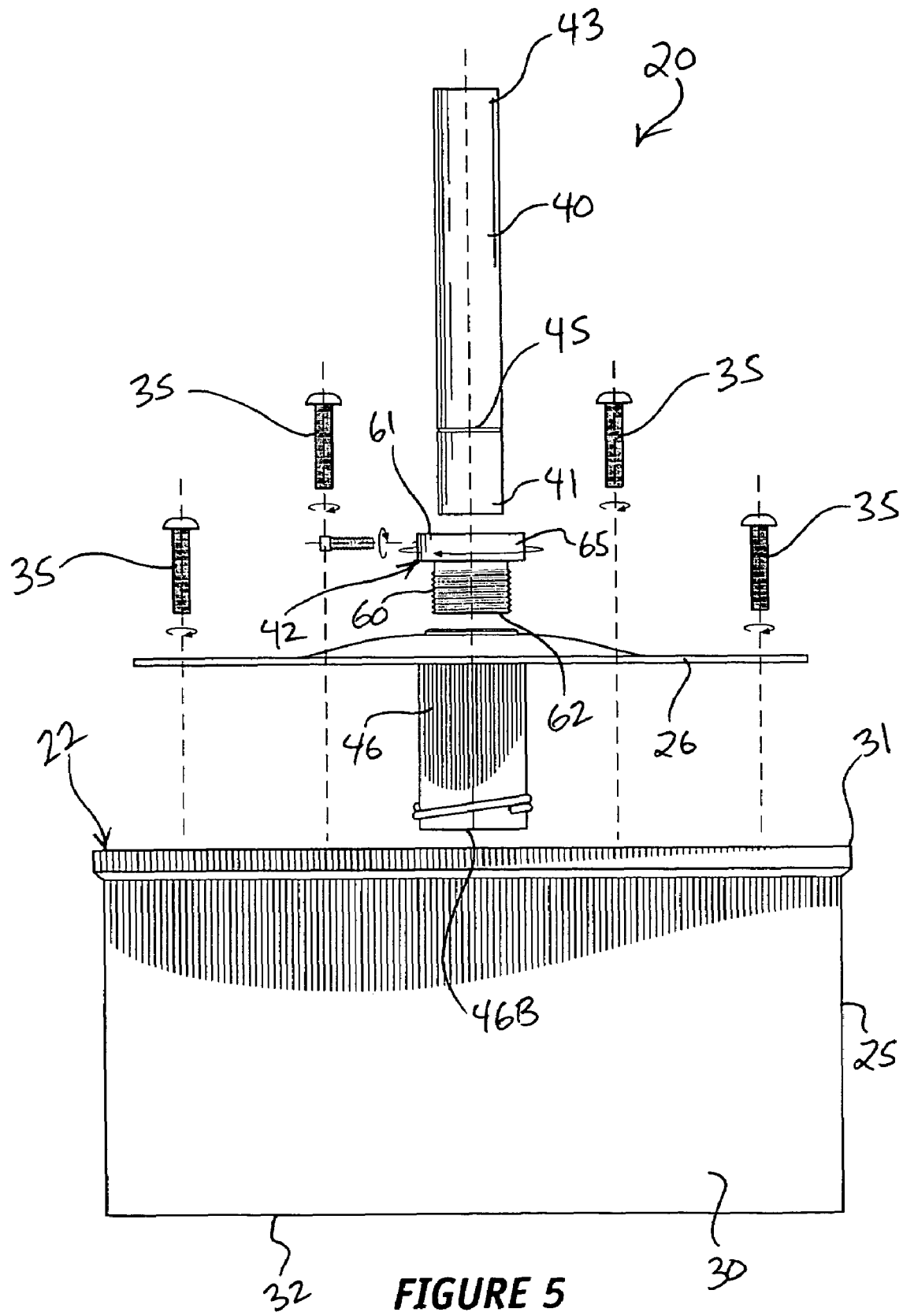
FIG. 5 is a partially exploded elevation view of the airport light installation of FIG. 1.
Figure 6:
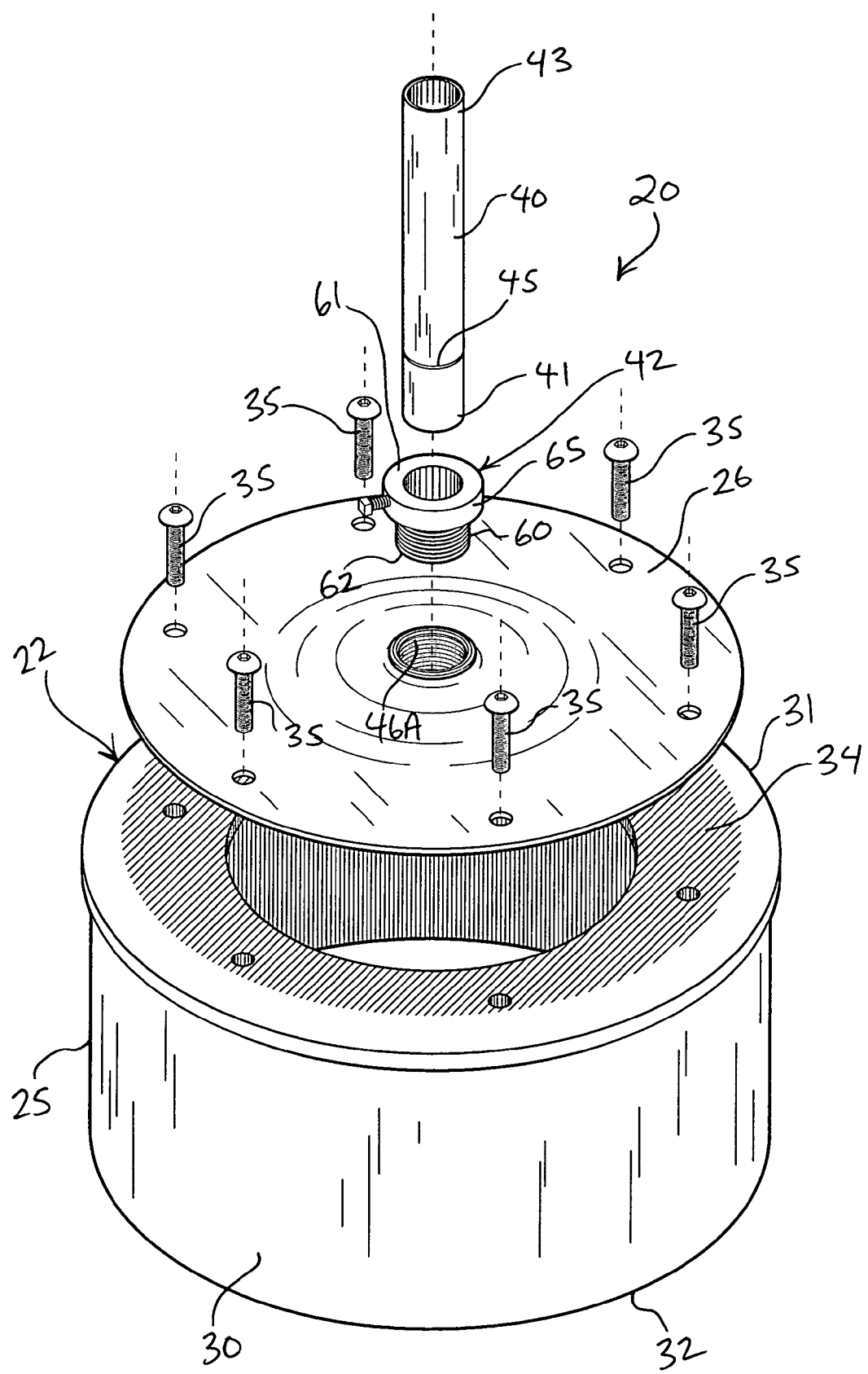
FIG. 6 is a partially exploded isometric view of the airport light installation of FIG. 1.

Referring to FIG. 4, coupling 42 is the mechanism that removably connects light fixture assembly 21 to support 22. The removable attachment of light fixture assembly 21 to connector 42 is desirable, because it allows light fixture assembly 21 to be easily removed for maintenance or repair, and because it allows proximal end 41 of column 40 to be easily removed from coupling 42 after column 40 is severed or broken at frangible area 45. In the preferred embodiment disclosed herein, coupling 42 includes a continuous sidewall 60 having an upper end 61 and an opposing lower end 62. Upper and lower ends 61 and 62 are each open. Upper end 61 is fashioned with an outwardly directed flange or lip 65, lower extremity 62 is fashioned with an inwardly directed flange or lip 66, and lower extremity 62 is threadably secured to sleeve 46 at its upper end 46A, in which coupling 42 is tightened in place so as to tighten flange 61A against the outer surface of lid 46. It is to be understood that lower end 62 of coupling 42 is outwardly threaded, and that sleeve 46 is correspondingly inwardly threaded at upper end 46A, and this provides the described threaded engagement between coupling 42 and support 22. The threaded engagement between coupling 42 and upper end 46A of sleeve 46 is representative of a preferred way of removably securing coupling 42 to lid 26 and, thus, to support 22. Coupling 42 can be removably attached in other ways, such as with a locking tongue and groove assembly, by way of a pinned attachment, etc. Other ways of removably attaching coupling 42 to lid 26 and, thus, to support 22, will readily occur to those skilled in the art. If desired, coupling 42 can be welded to lid, riveted to lid 26, or even integrally formed with lid 26. FIGS. 5 and 6 are instructive, as they show partially exploded views of installation including column 40, coupling 42, and support 22 including container 25 and lid 26. In FIGS. 5 and 6, column 40 is shown as it would appear with light fixture 44 detached from distal end 43.

In the installation of light fixture assembly 21, connector 50 is secured to connector 51, and proximal end 41 is then directed into coupling 42 through its upper extremity 61, which then comes to rest against inwardly directed flange 66 as shown in FIG. 4. Inwardly directed flange 66 functions as seat against which proximal end 41 presents and rests so as to be supported thereby. It is to be understood that the outer diameter of proximal end 41 of column 40 is somewhat less than the inner diameter of coupling 42, permitting proximal end 41 to be readily and easily received into coupling 42.

Further to FIG. 4, frangible area 45 is located outboard, or otherwise above, upper extremity 61 of coupling 42. Looking to FIG. 2, outwardly directed flange 65 of coupling supports a threaded bolt 70, which can be tightened against proximal end 41 of column 40 disposed through coupling 42 so as to secure column 40 in place to coupling 42 at distal end 41. Although not shown, it will be understood that a threaded bore extends through outwardly directed flange 66, and that bolt 70 is threadably received by the threaded bore. In response to rotation of bolt 70, bolt 70 can be moved into coupling 42 and toward and against proximal end 41 of column 40 so as to secure column 40 to coupling 42, and away from coupling 42 and from proximal end 41 of column 40 so as to release proximal end 41, and thus column 40, from coupling 42. Bolt 70 is illustrative of a locking element mounted to coupling 42 for movement between a first position into coupling 42 and toward and against proximal end 41 of column 40 so as to lock column 40 to coupling 42, and a second position away from coupling 42 and proximal end 41 of column so as to detach column 40 from coupling 42 permitting proximal end 41 of column to be removed from coupling 42. Although threaded bolt 70 is a preferred embodiment of such a reciprocally adjustable locking element, those having regard for the art will understand that other similarly functional locking element forms can be used for providing a detachably engagement of proximal end 41 of column 40 to coupling 42 without departing from the invention.

Figure 7:
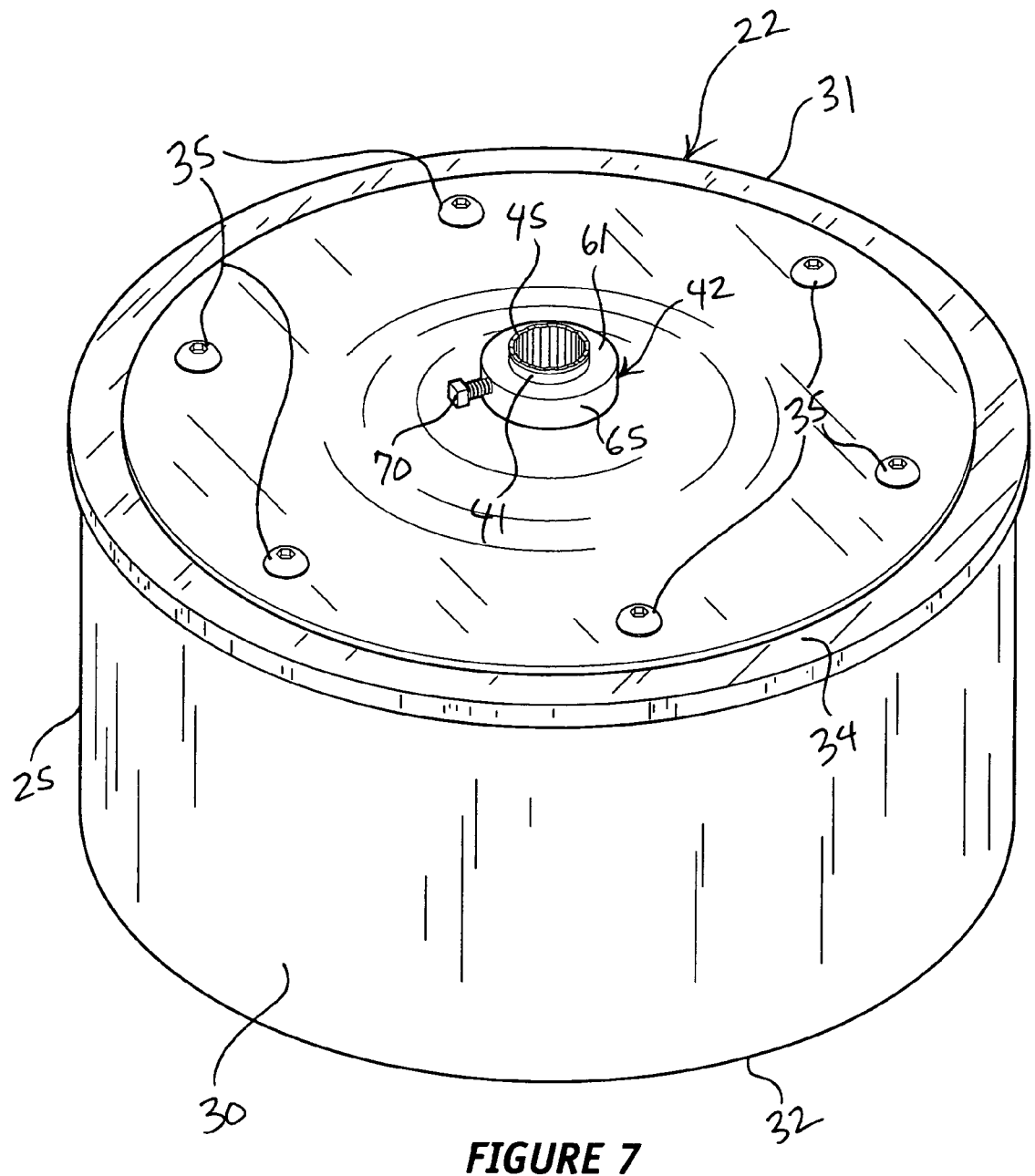
FIG. 7 is an isometric view of the airport light support of FIG. 1 as it would appear with the light fixture assembly broken away at the frangible area.

Looking to FIG. 4, frangible area 45 consists of an annular groove formed in column 40. This annular groove is essentially a thinned annular area of column 40. Frangible area 45 is, accordingly, a weakened area of column 40, and column 40 is thus designed to first break at frangible area 45 when it is struck by force that is sufficient to cause frangible area 45 to give way. Examples of instances in which column can be broken are if it is struck by a ground vehicle, an airplane, etc. When column 40 is broken at frangible area 45 as shown in FIG. 7, light fixture assembly 21 can fall away from support 22. Connectors 50 and 51 (FIGS. 1, 3, and 4) are designed to detach from one another if light fixture assembly 21 is broken away from support 22.

When light fixture assembly 21 is broken away at frangible area 45, the proximal end 41 fragment of column 40 is left remaining attached to coupling 42 as shown in FIG. 7. To reinstall a new, unbroken light fixture assembly, one need only loosen bolt 70 to release the proximal end 41 fragment, remove the proximal end 41 fragment, reinstall a new light fixture assembly as previously described, and then tighten bolt 70 so as to secure the new light fixture assembly to coupling 42. In accordance with the invention, coupling 42 need not be removed in order to facilitate a reinstallation of a new light fixture assembly.

Looking back to FIGS. 1 and 3, opposing, inwardly directed pins 90 and 91 are carried by sleeve 46 proximate lower end 46B. Pins 90 and 91 underlie sheath 55 and connector 51 and prevent sheath 55 and its attached connector 51 from falling away from sleeve 46 when connector 51 is detached from connector 50, such as prior to installation of light fixture assembly 21 and in the invent light fixture assembly 21 is broken away from support 22 and plug 50 detaches from plug 51. This is important, for it permits plug 51 to be easily accessed in the installation of light fixture assembly 21 and when reinstallation of a new light fixture assembly is required.

Figure 8:
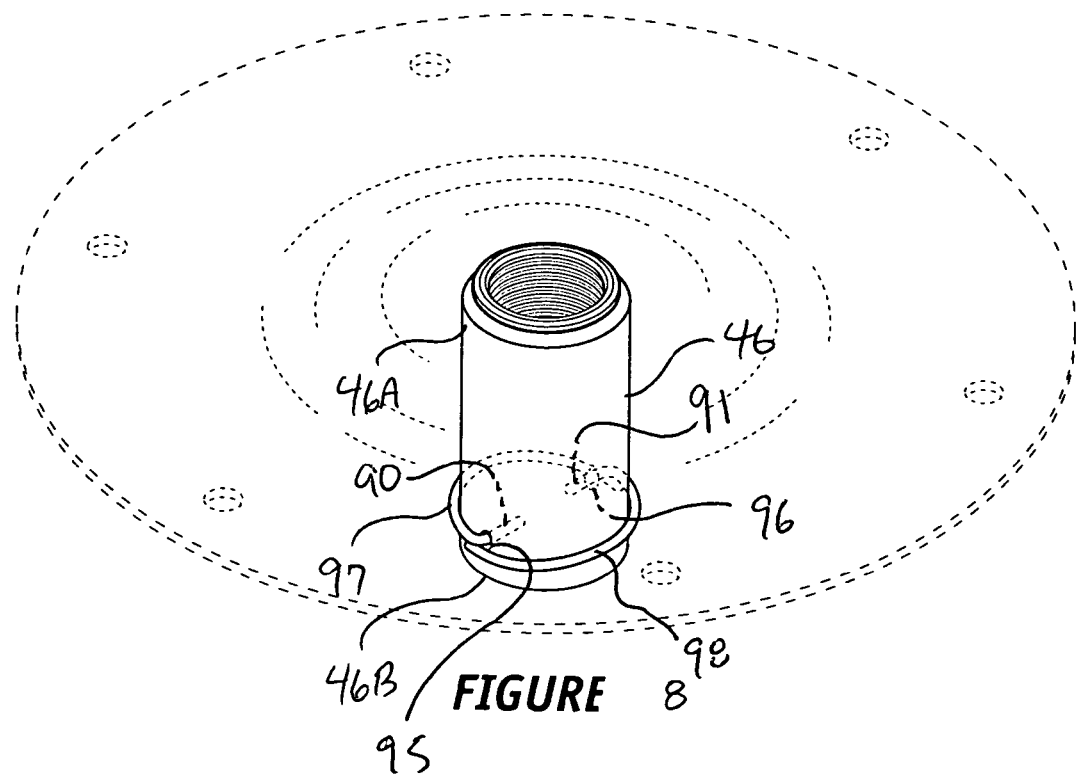
FIG. 8 is an isometric view of the sleeve of FIG. 1 with clips attached thereto, in which the lid is set forth in phantom outline for illustrative purposes.
Figure 9:
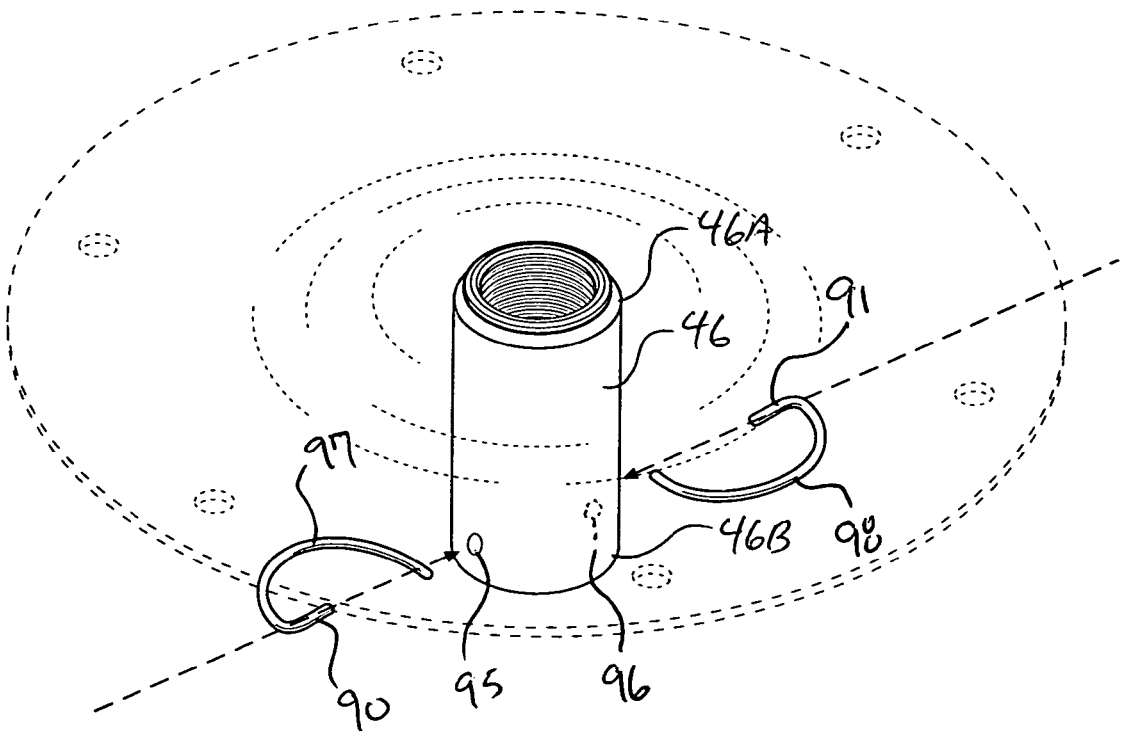
FIG. 9 is a view very similar to the view of FIG. 8, in which the clips are shown as they would appear detached from the sleeve.

Referring now FIGS. 8 and 9, pins 90 and 91 project through opposing openings 95 and 96 formed through sleeve 46 adjacent lower end 46B. Pins 90 and 91 are part of spring clips 97 and 98, respectively, which having arcuate portions 97A and 98A that partially encircle and grip sleeve 46, thus holding pins 90 and 91 in place. FIG. 9 shows clips 97 and 98 as they would appear detached from sleeve 46, and FIG. 9 shows clips 97 and 98 as they would appear attached to sleeve, in which pins 90 and 91 and opening 96 are set forth in phantom outline. To install clip 97, pin 90 is passed into and through opening 95 and its arcuate portion 97A is forcibly drawn around sleeve 46 so as to partially encircle sleeve 46 as shown. It is to be understood that the foregoing discussion of the installation of clip 97 applies to clip 98 in connection with opening 96. Clips 97 and 98 are each formed of spring form metal or other like material for causing them to grippingly secure sleeve 46 when installed in the manner herein described. Although two clips 97 and 98 are disclosed in the preferred embodiment herein disclosed along with their two respective pins 90 and 91, less or more can be used depending on specific needs or desires.

The present invention is described above with reference to a preferred embodiment. However, those skilled in the art will recognize that changes and modifications may be made in the described embodiment without departing from the nature and scope of the present invention. Various changes and modifications to the embodiment herein chosen for purposes of illustration will readily occur to those skilled in the art. To the extent that such modifications and variations do not depart from the spirit of the invention, they are intended to be included within the scope thereof.

Having fully described the invention in such clear and concise terms as to enable those skilled in the art to understand and practice the same, the invention claimed is:

What is claimed is:

1. An airport light installation comprising:
   an airport light support having a coupling;
   an elongate column having a proximal end attached to the coupling, an opposing distal end, and a frangible area formed in the elongate column between the proximal end and the distal end, the frangible area providing a point at which the elongate column will break when struck; and
   a light fixture carried by the distal end.

2. The airport light installation of claim 1, wherein the proximal end is removably attached to the coupling.

3. The airport light installation of claim 2, further comprising a locking element carried by the coupling and movable between a first position releasing the proximal end from the coupling and a second position securing the proximal end to the coupling.

4. The airport light installation of claim 1, wherein the coupling is removably attached to the airport light support.

5. The airport light installation of claim 1, further comprising the coupling threadably secured to the airport light support.

6. The airport light installation of claim 1, wherein the frangible area is disposed outboard of the coupling.

7. An airport lighting system incorporating the airport light installation of claim 1.

8. An airport light installation comprising:
   an airport light container;
   a lid, having a coupling, removably attached to the container;
   an elongate column having a proximal end attached to the coupling, an opposing distal end, and a frangible area formed in the elongate column between the proximal end and the distal end, the frangible area providing a point at which the elongate column will break when struck; and
   a light fixture carried by the distal end of the elongate column.

9. The airport light installation of claim 8, wherein the proximal end is removably attached to the coupling.

10. The airport light installation of claim 9, further comprising a locking element carried by the coupling and movable between a first position releasing the proximal end from the coupling and a second position securing the proximal end to the coupling.

11. The airport light installation of claim 8, wherein the coupling is removably attached to the lid.

12. The airport light installation of claim 8, wherein the coupling is threadably secured to the lid.

13. The airport light installation of claim 1, wherein the frangible area is disposed outboard of the coupling.

14. An airport lighting system incorporating the airport light installation of claim 8.

15. In an airport light installation including an airport light support and a coupling carried thereby, improvements therein comprising:
   an elongate column having a proximal end attached to the coupling, an opposing distal end, and a frangible area formed in the elongate column between the proximal end and the distal end, the frangible area providing a point at which the elongate column will break when struck; and
   a light fixture carried by the distal end of the elongate column.

16. The improvements of claim 15, further comprising the proximal end removably attached to the coupling.

17. The improvements of claim 16, further comprising a locking element carried by the coupling and movable between a first position releasing the proximal end from the coupling and a second position securing the proximal end to the coupling.

18. The improvements of claim 15, further comprising the coupling removably attached to the airport light support.

19. The improvements of claim 15, further comprising the coupling threadably secured to the airport light support.

20. The improvements of claim 15, wherein the frangible area is disposed outboard of the coupling.

21. An airport lighting system having an airport light installation incorporating the improvements of claim 15.

22. In an airport light installation including an airport light container, a lid removably attached to the container, and a coupling carried by the lid, improvements therein comprising:
   an elongate column having a proximal end attached to the coupling, an opposing distal end, and a frangible area formed in the elongate column between the proximal end and the distal end, the frangible area providing a point at which the elongate column will break when struck; and
   a light fixture carried by the distal end of the elongate column.

23. The improvements of claim 22, further comprising the proximal end removably attached to the coupling.

24. The improvements of claim 23, further comprising a locking element carried by the coupling and movable between a first position releasing the proximal end from the coupling and a second position securing the proximal end to the coupling.

25. The improvements of claim 22, wherein the coupling is removably attached to the lid.

26. The improvements of claim 22, wherein the coupling is threadably secured to the lid.

27. The improvements of claim 22, wherein the frangible area is disposed outboard of the coupling.

28. An airport lighting system having an airport light installation incorporating the improvements of claim 22.

* * * * *